United States Patent Office 3,166,585
Patented Jan. 19, 1965

3,166,585
2-DIMETHYLAMINOETHYL BETA-CYCLOPENTYL PROPIONATE AND THE MALEIC ACID SALT THEREOF
Raymond Valette, Paris, France, assignor to Les Laboratoires Albert Rolland, Paris, France, a French society
No Drawing. Filed Nov. 18, 1960, Ser. No. 73,160
Claims priority, application Great Britain, Nov. 20, 1959, 39,488/59
2 Claims. (Cl. 260—468)

This invention relates to beta cycloalkyl propionic esters of 2-dimethylaminoethanol, and more especially the beta-cyclopentylpropionic ester of 2 - dimethylaminoethanol, having the formula

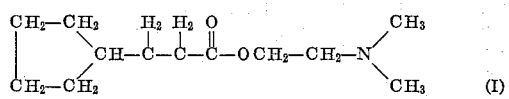

(I)

The invention further comprises the salts formed by such esters with organic acids such as maleic acid.

In accordance with the invention, the above identified esters are produced from beta cyclopentylpropionic acid and dimethylaminoethanol.

In one advantageous embodiment of the invention, which provides especially high efficiency, approaching quantitative yield, the acid chloride is condensed with the amino-alcohol in the form of a free base, whereby the hydrochloric acid released acts to salify the basic ester that is simultaneously formed.

The ester hydrochloride is isolated at the end of the process. However this hydrochloride is highly hygroscopic, so that it is preferred according to the invention to produce other and more stable addition salts.

For this purpose the base is used and again salified with the stoichiometric quantity of the selected acid. Some examples of the process will now be described for purposes of illustration only, and the first example relates to the preparation of the ester according to formula 1 above.

EXAMPLE 1

To 160 cc. (1 mole) of freshly distilled cyclopentyl-propionic acid chloride dissolved with 500 cc. benzene, 120 cc. (1 mole plus 10%) freshly distilled 2-dimethyl-aminoethanol diluted in 100 cc. of the same solvent, are added with mechanical agitation. External cooling is provided by a water bath and the rate of addition of the alcohol is controlled so as not to exceed more than a slight reflux.

When all the alcohol has been added, the water bath is heated to provide gentle reflux which is maintained six hours. The mixture is then allowed to stand overnight, then is filtered through a Büchner funnel to separate the crystalline precipitate formed by the desired ester hydrochloride; the precipitate is drained thoroughly, washed with a small amount of benzene, followed by ether, and dried in vacua. The resulting product, of hygroscopic character, melts at 164–165° C.

To obtain a less hygroscopic salt, the acid maleate for instance may be prepared. This is illustrated in Example 2 which relates to the preparation of the maleate.

EXAMPLE 2

250 g. of the hydrochloride obtained in Example 1 are dissolved in 200 cc. water, the solution is placed in a sedimentation apparatus with an equal volume of toluene, and an equivalent calculated amount soda lye is added. The mixture is thoroughly agitated for several minutes, then allowed to stand, the aqueous layer is separated off, and the toluenic layer is washed three times over with minimum amounts of water, and is then dried over anhydrous sodium sulfate.

The dried toluenic fraction is then stripped of toluene by distillation under reduced pressure, and to the base remaining in the apparatus there is added a titrated solution of maleic acid in alcohol, at a concentration of about 30%. The temperature of the mixture rises sharply, and the maleate separates out as a crystalline sludge. The alcohol is distilled off, the substance is taken up with anhydrous ether. The resulting friable mass is passed through a filter in vacuo and thoroughly drained. Practically pure acid maleate of beta-cyclopentyl-propionate of dimethylaminoethyl is obtained by this process. Its melting point is 129° C. It is found to have the following formula

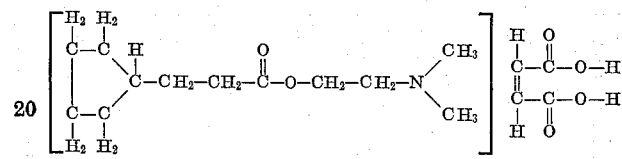

and the following elementary composition:

| Calculated | Found |
|---|---|
| C=58.35% | C=68.68 to 57.94% |
| H=8.20 | H=8.34 to 8.48 |
| N=4.25 | N=4.20 to 4.20 |

The amine when dosed with perchloric acid is found to be 100.34%.

Dimethylaminoethanol is known to possess desirable therapeutic activity as a cerebral stimulant. When this pharmacologically useful molecule is combined in the ether compound of the invention, the aforesaid useful action is delayed, i.e., the active portion of the combined molecule is only gradually released as the compound slowly saponifies in the organism. This is a therapeutically highly desirable feature of the compounds of the invention.

In this connection it has been shown that the compounds of the invention when exposed to acidic conditions are destroyed at a very much slower rate than are the compounds in which dialkylaminoethanol has been heretofore employed. To show this, comparative tests have been performed under conditions which approximate natural physiological conditions, using a large excess of hydrochloric acid at N/10 concentration, at 37° C. It has thus been found that 2-dimethylaminoethanol beta-cyclopentylpropionic ester saponifies in an amount of only 1.09% at the end of one hour, 3.40% at the end of three hours and 30% at the end of 24 hours, whereas the diethyl-aminoethyl ester of diphenylacetic ester for instance is totally saponified within about one hour.

Moreover, the compounds of the invention possess intense spasmolytic activity, an unexpected property in such a simple molecule.

Pharmacological tests have carried out on the acid maleate of dimethylaminoethyl beta-cyclopentylpropionate. Toxicity tests were performed with the following results.

Acute toxicity tests were made on male rats of the Wister breed, 8 weeks old. Each test involved a batch of 20 rats. Since the tests were repeated several times with batches of rats from different breeding stocks, variations in the rate of tolerance were observed. The values indicated hereinafter represent average values, from which maximum departures of ±10% occurred.

The lethal dose $DL_{50}$, when injected intraperitoneally was 922.5 mg. per kilogram weight of the animal, corresponding to 250 mg./kg. dimethylaminoethanol. When given orally, the lethal dose $DL_{50}$ was 3.69 g./kg., representing 1 mg./kg. dimethylaminoethanol.

Chronic toxicity tests were made with male Wister rats aged 10 to 12 weeks at the start of the test, all of the same stock, and of varying weights as indicated in the table hereinafter. All the animals were constantly fed with a similar diet (whole-diet rat biscuits, carrots, and water). All animals were held at a temperature of 22° C. during the tests.

*First series of tests*

There was intraperitoneally injected into each rat a dose of 498 mg./kg. day, corresponding to 135 mg./kg./day dimethylaminoethanol. The treatment lasted 50 days. Each rat thus received a total amount of 24.9 g. of the product per kg. weight.

| Rats | Treated animals | | Control animals | |
|---|---|---|---|---|
| | Weight as of 11 June 1960 | Weight as of 30 July 1960 | Weight as of 11 June 1960 | Weight as of 30 July 1960 |
| 1 | 100 | 329 | 98 | 316 |
| 2 | 85 | 279 | 89 | 281 |
| 3 | 80 | 260 | 84 | 265 |
| 4 | 125 | 327 | 130 | 331 |
| 5 | 110 | 321 | 128 | 329 |
| 6 | 105 | 341 | 110 | 357 |
| 7 | 85 | 274 | 88 | 281 |
| 8 | 105 | 369 | 90 | 350 |
| 9 | 100 | 344 | 105 | 342 |
| 10 | 85 | 334 | 89 | 329 |

*Second series of tests*

A dose of 369 mg./kg./day corresponding to 100 mg./kg./day dimethylaminoethanol was given orally to each tested rat. The treatment was continued 133 days, so that each rat received a total of 49.077 g./kg. of the combined product. The following results were had:

| Rats | Treated animals | | Controls | |
|---|---|---|---|---|
| | Weight as of 28 June 1960 | Weight as of 7 Nov. 1960 | Weight as of 28 June 1960 | Weight as of 7 Nov. 1960 |
| 1 | 110 | 245 | 132 | 276 |
| 2 | 155 | 285 | 157 | 273 |
| 3 | 140 | 245 | 138 | 252 |
| 4 | 185 | 310 | 176 | 290 |
| 5 | 150 | 295 | 151 | 285 |
| 6 | 140 | 275 | 145 | 265 |
| 7 | 145 | 270 | 145 | 278 |
| 8 | 135 | 248 | 138 | 256 |
| 9 | 175 | 290 | 173 | 294 |
| 10 | 150 | 280 | 150 | 280 |
| 11 | 125 | 250 | 129 | 247 |
| 12 | 110 | 242 | 123 | 249 |
| 13 | 135 | 270 | 138 | 276 |
| 14 | 160 | 262 | 165 | 278 |
| 15 | 120 | 220 | 124 | 233 |
| 16 | 170 | 300 | 169 | 303 |
| 17 | 130 | 220 | 133 | 226 |
| 18 | 165 | 310 | 171 | 298 |

*Third series of tests*

184.6 mg./kg./day of the drug were given to each animal, representing 50 mg./kg./day dimethylaminoethanol. The treatment was continued 133 days, so that each rat received 24.538 g./kg. of the drug.

| Rats | Treated Animals | | Controls | |
|---|---|---|---|---|
| | Initial weight | Weight as of 4 Nov. 1960 | Initial weight | Weight as of 4 Nov. 1960 |
| 1 | 130 | 228 | 139 | 238 |
| 2 | 165 | 287 | 167 | 280 |
| 3 | 155 | 265 | 158 | 270 |
| 4 | 145 | 255 | 140 | 249 |
| 5 | 170 | 307 | 177 | 321 |
| 6 | 115 | 215 | 123 | 225 |
| 7 | 155 | 280 | 157 | 288 |
| 8 | 115 | 280 | 112 | 276 |
| 9 | 110 | 270 | 119 | 281 |
| 10 | 125 | 278 | 123 | 281 |

In the above tests the control animals all were given corresponding volumes of solvent.

In the first series of tests the animals were further tested for their blood rates of urea, cholesterol and total seric protides before and after treatment. The following table indicates the variations in these quantities over the 50 days of treatment, the values being expressed as grams per 1.000.

| | Blood Urea | | Cholesterol | | Total protides | |
|---|---|---|---|---|---|---|
| | Before | After | Before | After | Before | After |
| 1 | 0.432 | 0.457 | 0.711 | 0.745 | 87 | 81 |
| 2 | 0.429 | 0.501 | 0.690 | 0.810 | 70 | 77 |
| 3 | 0.437 | 0.355 | 0.580 | 0.795 | 83 | 79 |
| 4 | 0.451 | 0.418 | 0.670 | 0.690 | 80 | 81 |
| 5 | 0.448 | 0.451 | 0.701 | 0.685 | 76 | 79 |
| 6 | 0.429 | 0.442 | 0.608 | 0.700 | 73 | 80 |
| 7 | 0.433 | 0.463 | 0.650 | 0.640 | 79 | 81 |
| 8 | 0.380 | 0.411 | 0.589 | 0.640 | 77 | 80 |
| 9 | 0.464 | 0.477 | 0.600 | 0.810 | 84 | 78 |
| 10 | 0.444 | 0.429 | 0.689 | 0.711 | 82 | 84 |

Clinical tests were carried out with the novel product in the form of tablets containing 92.5 mg. of beta-cyclopentylpropionyl-dimethylaminoethanol acid maleate. The chief therapeutic indications for the drug have been found to include conditions of physical and psychic fatigue, asthenia, anxiety and depressive conditions. A recommended posology is two of the above tablets a day.

Dimethylamino-ethanol, a recently synthesized product, is known to possess a stimulating and regulating action on the central nervous system. The beta-cycloalkyl-propionyl-dimethylaminoethanols of the invention are new derivatives of dimethylaminoethanol possessing beneficial delay properties as earlier mentioned, and is thus adapted to produce a regular and prolonged curative action.

The clinical tests mentioned above involved 28 subjects of both sexes, from 16 to 59 years old, and included the following cases:

(1) 11 cases of nervous asthenia
(2) 3 cases of post-infectious asthenia with apparent anxiety syndrome
(3) 6 cases of nervous asthenia and overwork
(4) 5 cases of anxiety and anger
(5) 3 cases of asthenia with neuro-vegetative disorders The average posology was 2 tablets a day for a period of 10 to 15 days. The urine and blood of all subjects were tested before and during the treatment. Appreciable results were observed in the majority of cases, with an increase in the energy capacity during the day. A favourable action on the asthenia condition was noted, to a varying but substantial degree, in all but two of the subjects in which no distinct result was observed. The psychic tonus and intellectual faculties as well as concentration were enchanced, and sleep was made deeper and more effective. In some cases there was an obvious improvement in the emotional sphere, and a reduction in the anxiety syndrome where present. The treatment as a whole demonstrated an appreciable improvement in the subjective conditions of the patients, and this condition was maintained throughout the treatment, with signs of normalization and satisfactory regulation of the central nervous system.

The drug was very well tolerated by all, nor did it provoke any undesirable allergic or other collateral reaction. Gastro-enteric tolerance was satisfactory, and there was no sign of any dyspeptic disturbance, with the doses given as indicated.

What I claim is:
1. 2-dimethylaminoethyl beta-cyclopentyl propionate.

2. The maleic acid salt of 2-dimethylaminoethyl beta-cyclopentyl propionate.

References Cited by the Examiner
UNITED STATES PATENTS

| | | | |
|---|---|---|---|
| 2,265,184 | 12/41 | Miescher et al. | 260—468 |
| 2,583,450 | 1/52 | Tilford et al. | 260—468 |
| 2,890,989 | 6/59 | Sahyun | 167—65 |
| 3,010,873 | 11/61 | Cavallini et al. | 167—65 |
| 3,036,115 | 5/62 | Rorig | 260—472 |

OTHER REFERENCES

Moffett et al.: JACS, 69, 1849–1857 (1947).

LEON ZITVER, *Primary Examiner.*

IRVING MARCUS, DUVAL T. McCUTCHEN,
*Examiners.*